(12) United States Patent
Tatsumi

(10) Patent No.: US 7,999,977 B2
(45) Date of Patent: Aug. 16, 2011

(54) NETWORK PRINTING APPARATUS

(75) Inventor: Setsuji Tatsumi, Kanagawa-ken (JP)

(73) Assignee: Fujifilm Corporation, Tokyo (JP)

( * ) Notice: Subject to any disclaimer, the term of this patent is extended or adjusted under 35 U.S.C. 154(b) by 1189 days.

(21) Appl. No.: 11/717,726

(22) Filed: Mar. 14, 2007

(65) Prior Publication Data
US 2007/0216946 A1 Sep. 20, 2007

(30) Foreign Application Priority Data

Mar. 15, 2006 (JP) .................. 2006-071552

(51) Int. Cl.
*H04N 1/46* (2006.01)
*H04N 7/173* (2011.01)
(52) U.S. Cl. ...................... 358/500; 725/112
(58) Field of Classification Search .......... 358/500, 358/1.15, 1.16, 1.18, 1.1, 405, 1.13; 348/552, 348/734; 725/112, 83, 153, 133, 80, 110; 710/301, 22, 10, 8, 110; 709/206, 223
See application file for complete search history.

(56) References Cited

U.S. PATENT DOCUMENTS

| 2002/0060748 A1 | 5/2002 | Aratani et al. |
| 2002/0062487 A1 | 5/2002 | Ohno et al. |
| 2003/0164973 A1* | 9/2003 | Hisatomi et al. ............. 358/1.15 |

FOREIGN PATENT DOCUMENTS

| JP | 2002-158976 A | 5/2002 |
| JP | 2002-158979 A | 5/2002 |
| JP | 2005-210408 A | 8/2005 |

* cited by examiner

*Primary Examiner* — Saeid Ebrahimi Dehkordy
(74) *Attorney, Agent, or Firm* — Birch, Stewart, Kolasch & Birch, LLP.

(57) ABSTRACT

The network printing apparatus is adapted to connection with an external information apparatus through a network. The network printing apparatus includes: a print data acquisition device which acquires print data outputted by the external information apparatus through the network; and a print data storage device which stores the print data acquired by the print data acquisition device. The external information apparatus includes a digital broadcast receiving apparatus which receives data transmitted through digital broadcasting. The network printing apparatus prints the print data stored in the print data storage device.

19 Claims, 12 Drawing Sheets

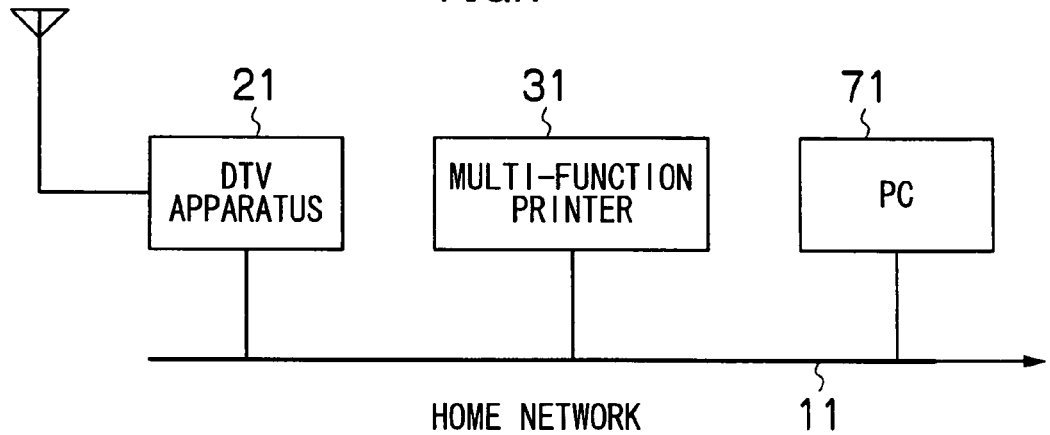
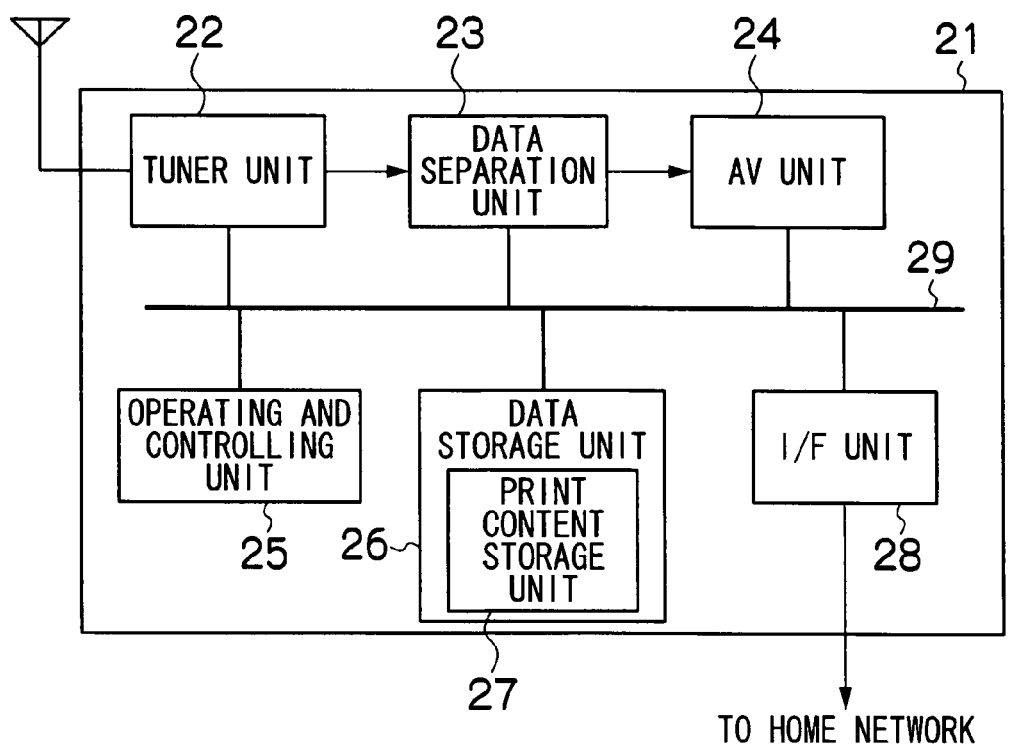

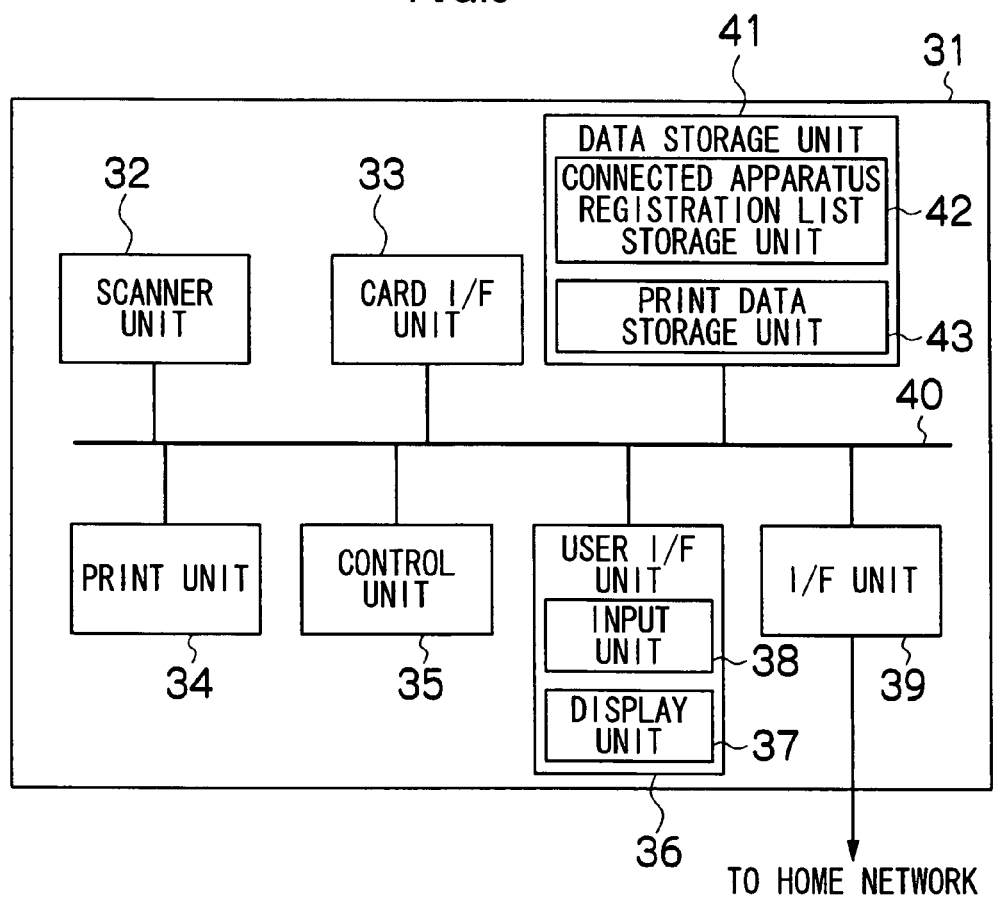

FIG.10

| LIST NUMBER | REGISTRATION MODE | NAME OF CONNECTED APPARATUS |
|---|---|---|
| 1 | 2 | DTV |
| 2 | 1 | PC-X |
| 3 | 0 | PC-Y |
| 99 | 3 | DEFAULT |

REGISTRATION MODE

0: NOT REGISTERED
1: PRINT
2: MEMORY
3: PRINT & MEMORY

NETWORK PRINTING APPARATUS

BACKGROUND OF THE INVENTION

1. Field of the Invention

The present invention relates to a network printing apparatus, and more particularly, to a printing apparatus for printing data acquired by a digital broadcasting receiving apparatus or a personal computer (PC), connected to a network.

2. Description of the Related Art

In recent years, with the start of BS (Broadcasting Satellite) digital broadcasting, it has become necessary for digital television receiving apparatuses (hereinafter referred to as "DTV" or "DTV apparatus") to process non-TV-program data (i.e., data other than TV-program data) upon receiving such data. It has become possible to acquire "print data" relating to TV-programs in the form of non-TV-program data by the DTV apparatus, and to produce paper copies based on the print data with a printer connectable to the DTV apparatus. Specific examples of the print data include recipes from cookery programs, tourist guides relating to travel programs, and the like.

While a user, namely, a viewer is watching a TV-program, print contents and a print button are displayed on the screen as and when necessary, and setting information such as paper size and number of sheets required is simultaneously displayed. In this state, the viewer refers to the display and presses the print button, and print data is then transmitted to the printer from the DTV apparatus and printing is carried out.

Although there may be a case where the viewer does not know the print contents on the DTV apparatus since the printing is carried out with the printer, the viewer is usually able to determine the print contents from what the program is associated with if the viewer is viewing the program, and the problem of printing unintended contents, or the like, can be prevented even in cases where the ultimate print contents cannot be ascertained.

When the printing with the printer is instructed, the DTV apparatus needs to be in connection with the printer, and the printer needs to be completely provided with paper, ink cartridges, and the like. If there is a problem in any of these items, then it is not possible to start printing. Furthermore, there are also cases where the user may wish to carry out printing later. In such cases, the print data is temporarily saved, and the printing is carried out after the preparations of the printer are completed.

However, if printing is carried out after temporarily saving the data, then as described above, there may be a case where the user does not know the print contents on the DTV apparatus, and there may be a case where the user cannot remember the print setting information having been displayed during the program, due to the passage of time. Consequently, tasks such as selecting the print objects may become difficult.

The following methods have been proposed in order to eliminate the above-described problems.

Japanese Patent Application Publication No. 2002-158976 discloses a method in which the user is informed of the existence of print contents, information such as the paper required to print the contents is also notified to the user through the DTV apparatus, and the user is prompted to carry out the preparations necessary for the printing.

Japanese Patent Application Publication No. 2002-158979 discloses a method in which a state of the printer is monitored through the DTV apparatus, and the user can be informed of progress of print processing or abnormal status of the print processing through the screen of the DTV apparatus.

Japanese Patent Application Publication No. 2005-210408 discloses a method in which print contents are stored in association with captured image data of the display screen, and the print contents thus stored in a storage device is printed. In this method, the storage device is arranged in the DTV apparatus, and the printing operation is controlled by the DTV apparatus.

However, in the methods described in Japanese Patent Application Publication Nos. 2002-158976, 2002-158979 and 2005-210408, the printing operation is controlled through the DTV apparatus or the status of the printer is displayed on the screen of DTV apparatus. Then, the user must travel between the DTV apparatus and the printer, and the task of printing, or the like, is inconvenient if the DTV apparatus and the printer are situated separately. Moreover, the DTV apparatus is originally intended for the purpose of enjoying moving pictures, and hence, if a message, such as a print error message, is unexpectedly displayed on the screen while the viewer is watching moving pictures, then the viewer will not be able to concentrate on viewing the moving pictures. Consequently, this obstructs the original object of viewing moving pictures for which the DTV apparatus is especially designed. Furthermore, in cases where a user wishes to perform printing and another user wishes to enjoy watching a program with the same DTV apparatus, there is a problem in that both of these wishes cannot be satisfied at the same time.

SUMMARY OF THE INVENTION

The present invention has been contrived in view of the foregoing circumstances, an object thereof being to provide a network printing apparatus which is capable of printing information acquired by a connected apparatus, such as a DTV apparatus connected to a network, or the like, in a simple fashion, without affecting the viewing of the connected apparatus, such as the DTV apparatus.

In order to attain the aforementioned object, the present invention is directed to a network printing apparatus adapted to connection with an external information apparatus through a network, the network printing apparatus comprising: a print data acquisition device which acquires print data outputted by the external information apparatus through the network; and a print data storage device which stores the print data acquired by the print data acquisition device, wherein the external information apparatus includes a digital broadcast receiving apparatus which receives data transmitted through digital broadcasting, and the network printing apparatus prints the print data stored in the print data storage device.

According to this aspect of the present invention, it is possible to carry out printing by means of an operation on the printer side, and error reports (displays), such as out-of-paper, out-of-ink or paper jam notifications during the printing operation are not displayed on the connected apparatus, such as a DTV apparatus, at an undesirable timing. Therefore, no disruption is caused to the viewing of the connected apparatus, such as the DTV apparatus. Moreover, since the print data is stored in the network printing apparatus, then the printing operation can be carried out using the network printing apparatus, even if the power to the DTV apparatus, or the like, is switched off. Similarly, when additional printing is required, it is not necessary to turn on the DTV apparatus, or the like.

In order to attain the aforementioned object, the present invention is also directed to a network printing apparatus adapted to connection with an external information apparatus through a network, the network printing apparatus comprising: a print data acquisition device which acquires print data outputted by the external information apparatus through the network; a print data storage device which stores the print data acquired by the print data acquisition device; a list display device which displays a list of the print data acquired by the print data acquisition device; and a print data selection device with which selection of the print data to be printed is implemented from the list of the print data displayed on the list display device, wherein the external information apparatus includes a digital broadcast receiving apparatus which receives data transmitted through digital broadcasting, and the network printing apparatus prints the print data stored in the print data storage device according to the selection having the print data implemented with the print data selection device.

According to this aspect of the present invention, it is possible to carry out printing by means of an operation on the printer side, and error reports (displays), such as out-of-paper, out-of-ink or paper jam notifications during the printing operation are not displayed on the connected apparatus, such as a DTV apparatus, at an undesirable timing. Therefore, no disruption is caused to the viewing of the connected apparatus, such as the DTV apparatus. Moreover, since the print data is stored in the network printing apparatus, then the printing operation can be carried out using the network printing apparatus, even if the power to the DTV apparatus, or the like, is switched off. Similarly, when additional printing is required, it is not necessary to turn on the DTV apparatus, or the like. Furthermore, by displaying a printing list, the user becomes able to select the data intended to be printed, readily.

Preferably, when the network printing apparatus is in connection with a plurality of the external information apparatuses through the network, selection of processing for the print data acquired by the print data acquisition device is implemented with respect to each of the external information apparatuses that has outputted the print data to be subjected to the processing, the processing being subjected to the selection including to record the print data on the print data storage device and to print the print data.

According to this aspect of the present invention, it is possible to set the processing in the network printing apparatus to the most desirable processing, for each connected apparatus. In the DTV apparatus, for example, it is preferable to avoid ill-timed issuing of error reports (displays) occurring during a printing operation. Therefore, it is preferable to adopt settings in which storage of print data is set only for a DTV apparatus and normal printing is set for a personal computer (PC).

Preferably, when the network printing apparatus is in connection with a plurality of the external information apparatuses through the network, selection of processing for the print data acquired by the print data acquisition device is implemented with respect to each of the external information apparatuses that has outputted the print data to be subjected to the processing, the processing being subjected to the selection including to record the print data on the print data storage device, to print the print data, and to record the print data on the print data storage device and also print the print data.

According to this aspect of the present invention, it is possible to perform additional printing in the network printing apparatus. Even if a print error occurs, it is possible to carry out printing again using the print data recorded in the print data storage device.

Preferably, the network printing apparatus according to the present invention further comprises a processing selection device with which the selection of processing for the print data is implemented.

According to this aspect of the present invention, it is possible to use the network printing apparatus in accordance with the wishes of the user.

Preferably, the selection of processing for the print data is also implemented by each of the external information apparatuses.

According to this aspect of the present invention, it is possible to select the processing in the network printing apparatus for each print data.

Preferably, the print data storage device includes at least one of a hard magnetic disk and a non-volatile semiconductor memory.

According to this aspect of the present invention, it is possible to record a large volume of print data.

Preferably, the network printing apparatus prints the print data by an inkjet method.

According to this aspect of the present invention, it is possible to print at low cost, in a manner suitable to domestic use.

In the network printing apparatus according to the present invention, it is possible to print information acquired by an apparatus (e.g., a DTV apparatus) in connection with the network printing apparatus through a network, in a simple manner, without affecting the viewing, or the like, of the connected apparatus (e.g., the DTV apparatus).

BRIEF DESCRIPTION OF THE DRAWINGS

The nature of this invention, as well as other objects and benefits thereof, will be explained in the following with reference to the accompanying drawings, in which like reference characters designate the same or similar parts throughout the figures and wherein:

FIG. 1 is a block diagram showing the system composition including a network printing apparatus according to an embodiment of the present invention and connected apparatuses;

FIG. 2 is a block diagram showing the internal composition of a DTV apparatus connected to the network printing apparatus;

FIG. 3 is a block diagram showing the internal composition of the network printing apparatus;

FIG. 10 is an illustrative diagram showing a structure of data stored in a connected apparatus registration list storage unit in the network printing apparatus according to the second embodiment of the present invention;

DETAILED DESCRIPTION OF THE PREFERRED EMBODIMENTS

Figure 4:
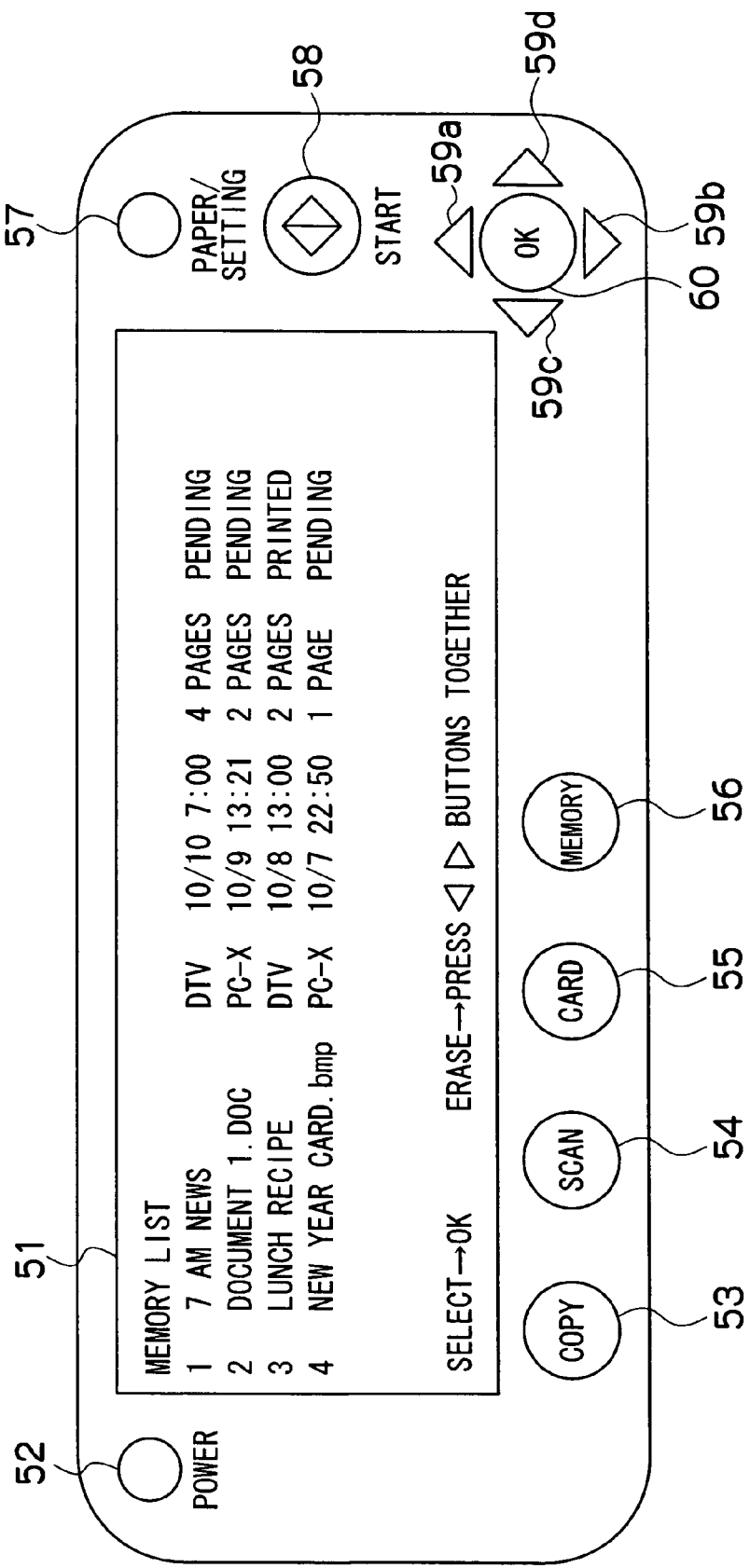
FIG. 4 is a schematic drawing showing a state of an interface panel of the network printing apparatus, where a memory list is displayed.

FIG. 1 is a diagram showing the overall system including a network printing apparatus and a connected apparatus according to a first embodiment of the present invention. As shown in FIG. 1, in this system, a DTV apparatus 21 serves as a receiving apparatus that receives a television signal from a broadcasting station, then displays video images, sound and operation data, and the like, and has an audio output section and a data storage unit forming a data storage device that stores acquired information as described below.

The DTV apparatus 21 is in connection with a multifunction printer 31, which serves as the network printing apparatus, through a home network 11, which is a network circuit, thereby creating a state where communication and controlling between the DTV apparatus 21 and the multifunction printer 31 can be implemented. The multifunction printer 31 serves as a printing apparatus for printing data acquired through digital broadcasting. Moreover, a personal computer (PC) 71 or the like may be connected to this home network 11, and in this case, it is possible to perform communication and controlling between the multifunction printer 31 and the PC 71, and between the DTV apparatus 21 and the PC 71.

FIG. 2 is a diagram showing the DTV apparatus 21 used in the first embodiment. The DTV apparatus 21 is constituted by several sections in order to achieve the functions of the DTV apparatus 21. A tuner unit 22 selects a desired reception frequency from the received high-frequency digital broadcast TV signals, amplifies the TV signal, and demodulates the transport stream (TS) data composed of video/audio data and other various types of data.

A data separation unit 23 is a circuit for separating the TS data into video/audio program data, program information data, program control document data, print data, and other datacasting data. The video/audio program data is sent to an AV unit 24 described later, and the other data, namely, the program information data, the program control document data, the print data and the other datacasting data, are sent to and stored in a memory unit (not shown).

In order to display video images and to output sound, the AV unit 24 firstly separates the received signals into a video signal and an audio signal, by means of a broadcast video/audio data decoding unit.

The audio signal is synthesized and adjusted to control the volume, quality, presence, and other aspects, of the output sound, and is amplified and then applied to speakers (not shown) to be outputted as the sound. The video signal is synthesized and subjected to conversion, correction, and the like, to control the size, brightness, and other aspects, of the image to be displayed, and is then sent to a display apparatus (not shown), such as a monitor, to be displayed as the image.

The AV unit 24 may receive signals through an internal bus 29, as well as the signals sent from the data separation unit 23, and the signals received through the internal bus 29 are also subjected to similar processing in the AV unit 24 and are outputted through the speakers and the monitor.

An operating and controlling unit 25 is operated by the user (TV viewer), and the operating and controlling unit 25 serves to control universally all of the sections in the DTV apparatus 21. The operating and controlling unit 25 is constituted by a CPU, memory, bus control unit, program storage unit, parameter control unit, ID storage unit, clock unit (all of which are not shown), and the like.

A data storage unit 26 is constituted by a rewriteable non-volatile memory and/or an auxiliary storage device, such as a hard disk apparatus, or the like. The data storage unit 26 stores the program information data, program reproduction document, print data, and the other datacasting data separated by the data separation unit 23. The data storage unit 26 also stores data captured by the AV unit 24, fee payment control data, user's viewing history data, and the like, as and when required, in accordance with instructions from the user or instructions issued by the operating and controlling unit 25. The data storage unit 26 is provided with a print content storage unit 27, which is used for separately storing information relating to the print contents, and the like.

An interface (I/F) unit 28 is a circuit for connecting to the multifunction printer 31 shown in FIG. 1, and the like, through the home network 11. The I/F unit 28 is controlled by the operating and controlling unit 25 of the DTV apparatus 21, and the DTV apparatus 21 outputs the print data to the external apparatus through the home network 11. The I/F unit 28 is also used when the DTV apparatus 21 is transmitting or receiving various types of data, such as when it is connected to the broadcasting station management server, when it is connected to the Internet, or when controlling charges for pay-per-view programs. The received data is stored in the data storage unit 26 according to requirements.

When receiving a TV signal using the DTV apparatus 21 having the composition described above, signal processing is carried out by the tuner unit 22 and the data separation unit 23. A channel is selected by the operating and controlling unit 25 in accordance with instructions from the user, and the broadcast waves of corresponding frequencies are received and the TS data is demodulated. Then, the data separation unit 23 separates the TS data into program data, program information data, print data, datacasting data, and the like. The program data is supplied to the AV unit 24, and is then presented to the user as audio information and image information through the speakers and the monitor. Moreover, the program information data, print data, datacasting data, and the like, are stored in the data storage unit 26, as and when required, through the internal bus 29. The DTV apparatus 21 is provided with the common bus 29, through which various data is transmitted inside the DTV apparatus 21.

The DTV apparatus 21 has a print button (not shown) (e.g., in a remote controller for the DTV apparatus 21). When the user presses the print button, a print request is issued.

FIG. 3 is a diagram showing the composition of the multifunction printer 31 according to the first embodiment.

The multifunction printer 31 has a scanner unit 32, through which images can be captured, and a card I/F unit 33. The multifunction printer 31 can acquire image data through the scanner unit 32 or the card I/F unit 33, in addition to the data inputted through the home network 11.

A print unit 34 has a function for printing an image in accordance with the print data received through the home network 11 or acquired through the scanner unit 32 or the card I/F unit 33, and the print unit 34 prints the images by means of an inkjet method or an electrophotographic method.

The control unit 35 controls the whole of the multifunction printer 31, and has functions for controlling all sections in the multifunction printer 31.

The user I/F unit 36 serves to exchange information between the user and the multifunction printer 31. The user I/F unit 36 has a display unit 37, which enables showing information provided by the multifunction printer 31 to the user, and has an input unit 38 for transmitting instructions from the user to the multifunction printer 31. The multifunction printer 31 is controlled by the control unit 35 in accordance with the input information from the input unit 38.

An I/F unit 39 is a circuit for connecting to the DTV apparatus 21 shown in FIG. 1, or the like, through the home network 11. The I/F unit 39 has a function of transmitting instruction information from the control unit 35, or the like, to the DTV apparatus 21 through the home network 11, and a function of inputting information from the DTV apparatus 21 or the PC 71 to the multifunction printer 31 through the home network 11. The I/F unit 39 serves as the "printing data acquisition device".

A data storage unit 41 is constituted by a magnetic recording medium, such as a hard disk, or a non-volatile semiconductor recording medium, such as a flash memory. The data storage unit 41 includes a connected apparatus registration list storage unit 42 and a print data storage unit 43.

Registration information for the apparatuses that are connected to the multifunction printer 31 through the home network 11 is recorded on the connected apparatus registration list storage unit 42. The print data information obtained from the registered connected apparatuses is recorded on the print data storage unit 43.

The multifunction printer 31 is provided with a common bus 40, through which various data is transmitted inside the multifunction printer 31.

Next, an interface panel of the user I/F unit 36 of the printing apparatus for printing data acquired through digital broadcasting according to the first embodiment is described. Control operations made by the user and information presented from the multifunction printer 31 to the user are displayed on the interface panel of the user I/F unit 36 of the multifunction printer 31.

FIG. 4 is a diagram showing the interface panel of the user I/F unit 36 of the multifunction printer 31.

The interface panel of the user I/F unit 36 shown in FIG. 4 includes the display unit 37 and the input unit 38. The display unit 37 has a display screen 51 composed of a liquid crystal display panel, or the like, and shows various types of information relating to the multifunction printer 31. The input unit 38 includes a power button 52, a copy button 53, a scan button 54, a card button 55, a memory button 56, a paper/setting button 57, a start button 58, item movement buttons 59a, 59b, 59c and 59d, with which selected items can be switched upwards, downwards, leftwards or rightwards, and an OK button 60, with which the wish to confirm settings is indicated.

The power button 52 is used for switching the power of the multifunction printer 31 on and off. By pressing the power button 52, the power supply switches on, and the multifunction printer 31 starts up.

The copy button 53 is used for starting an operation whereby an image is captured through the scanner unit 32 of the multifunction printer 31, and the print unit 34 copies the captured image onto a recording medium, such as paper.

The scanner button 54 is used for starting an operation whereby an image is captured through the scanner unit 32 of the multifunction printer 31, and the data of the captured image is transferred to the PC (not shown), or the like, through the home network.

The card button 55 is used for starting an operation whereby information is read in from cards of various types on which the information is recorded electrically or magnetically, by means of the card I/F unit 33 of the multifunction printer 31, and the print unit 34 produces a copy based on the read data onto a recording medium, such as paper. Here, the "card" is a removable card used for recording image data, such as a digital camera card, and the card stores the data with a semiconductor recording device such as a flash memory, a magnetic recording medium, or the like.

The memory button 56 is used for starting an operation whereby the information stored in the data storage unit 41 of the multifunction printer 31 is displayed on the display unit 37, for example. Specific details of the operation are described later with reference to flowcharts.

The paper/setting button 57 is used for setting the paper to be used in the multifunction printer 31 and setting the functions. By pressing the paper/setting button 57, information relating to the setting information of the multifunction printer 31 is displayed on the display screen 51. The user operates the item movement buttons 59a, 59b, 59c and 59d, and the OK button 60, on the basis of the information displayed on the display screen 51, thereby setting the multifunction printer 31 to a desired state. By pressing the paper/setting button 57, the information set with the item movement buttons 59a, 59b, 59c and 59d and the OK button 60 is then stored in the data storage unit 41 of the multifunction printer 31.

The start button 58 is used for starting printing of desired print contents, or the like, with the multifunction printer 31. More specifically, by pressing the start button 58, information indicating that the start button 58 has been pressed is transmitted to the control unit 35 through the common bus 40. The control unit 35 then sends image data of the printing object to the print unit 34 through the common bus 40, and the prescribed image that has been selected is printed onto a recording medium, such as paper, by the print unit 34.

The item movement buttons 59a, 59b, 59c and 59d are used for switching items selected from the various items displayed on the display screen 51 concerning the information displayed on the display screen 51. Four item movement buttons 59a, 59b, 59c and 59d are arranged for the up, down, left and right directions, in order to move upwards, downwards, leftwards and rightwards on the display screen 51. The OK button 60 is used for indicating a desire to confirm the information selected with the item movement buttons 59a, 59b, 59c and 59d on the display screen 51. The selection of the print information, setting information and other types of information displayed on the display screen 51 is set by operating the item movement buttons 59a, 59b, 59c and 59d, and the OK button 60.

Next, the sequence of processing for printing with the multifunction printer 31 as the network printing apparatus according to the first embodiment is described with reference to FIG. 5.

Figure 5:
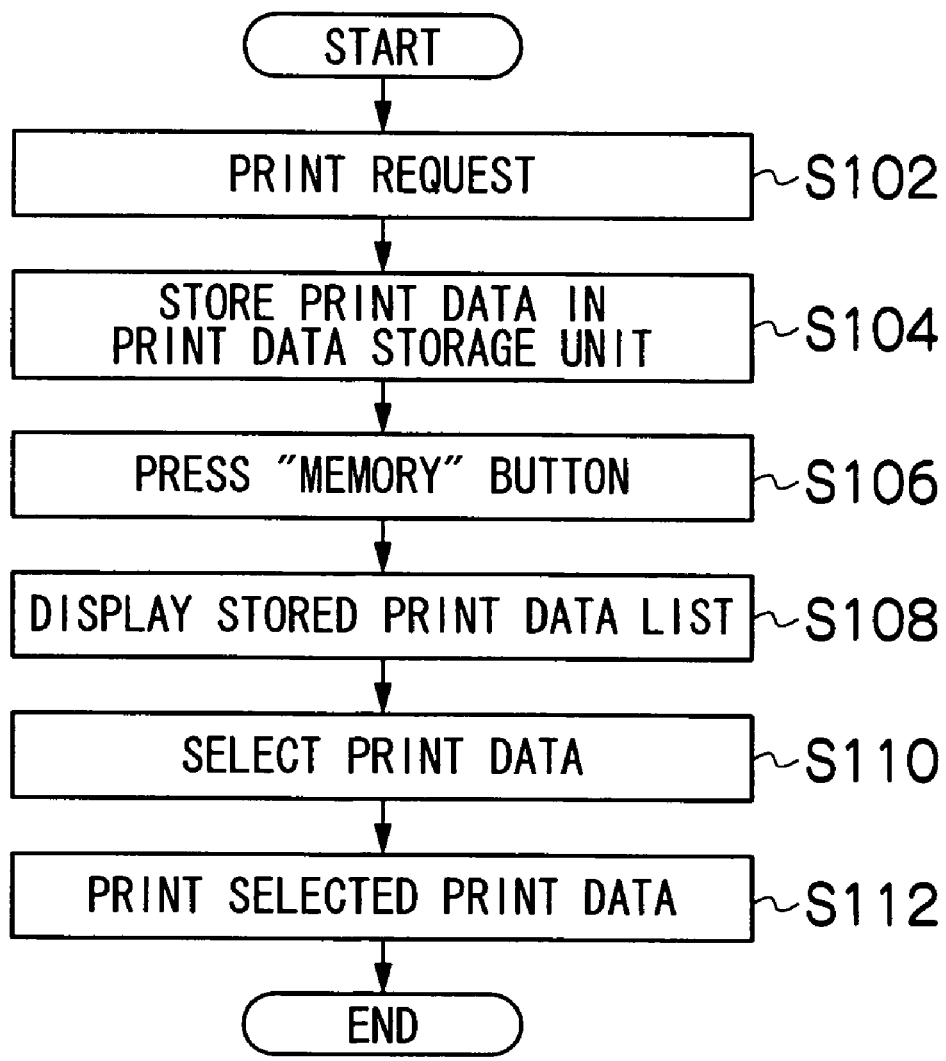
FIG. 5 is a flowchart of processing in the network printing apparatus according to a first embodiment of the present invention.

At step S102 in FIG. 5, when a print request is issued by a connected apparatus, such as the DTV apparatus 21 or the PC 71, which is connected to the home network 11, then a printing operation is started in the multifunction printer 31.

More specifically, the print request is issued to the multifunction printer 31 when the user presses the print button provided for the DTV apparatus 21, or when application software in the PC 71 issues a print instruction, or the like. Upon the print request, print data and the print request information for the multifunction printer 31 is transmitted to the multifunction printer 31 through the home network 11.

Thereupon, at step S104, the print data is stored in the print data storage unit 43, which serves as the print data storage device. More specifically, the print data that has been stored in the DTV apparatus 21 or the PC 71 and transmitted to the multifunction printer 31 is stored in the print data storage unit 43 in the data storage unit 41.

Thereupon, at step S106, when the user presses the memory button 56, then information indicating the pressing of the memory button 56 is transmitted to the control unit 35.

Thereupon, at step S108, the print data list stored in the print data storage unit 43 is displayed. More specifically, a control signal is issued for displaying the print data list on the display unit 37 of the interface panel, in accordance with the signal that has been transmitted to the control unit 35 at step S106 to indicate the pressing of the memory button 56. The control signal for displaying the print data list is transmitted from the control unit 35 to the data storage unit 41 through the common bus 40, and then the print data list information for the print data stored in the print data storage unit 43 of the data storage unit 41 is retrieved and transmitted to the display unit 37 in the user I/F unit 36 through the common bus 40. The print data list information is thus displayed on the display unit 37.

Figure 6:
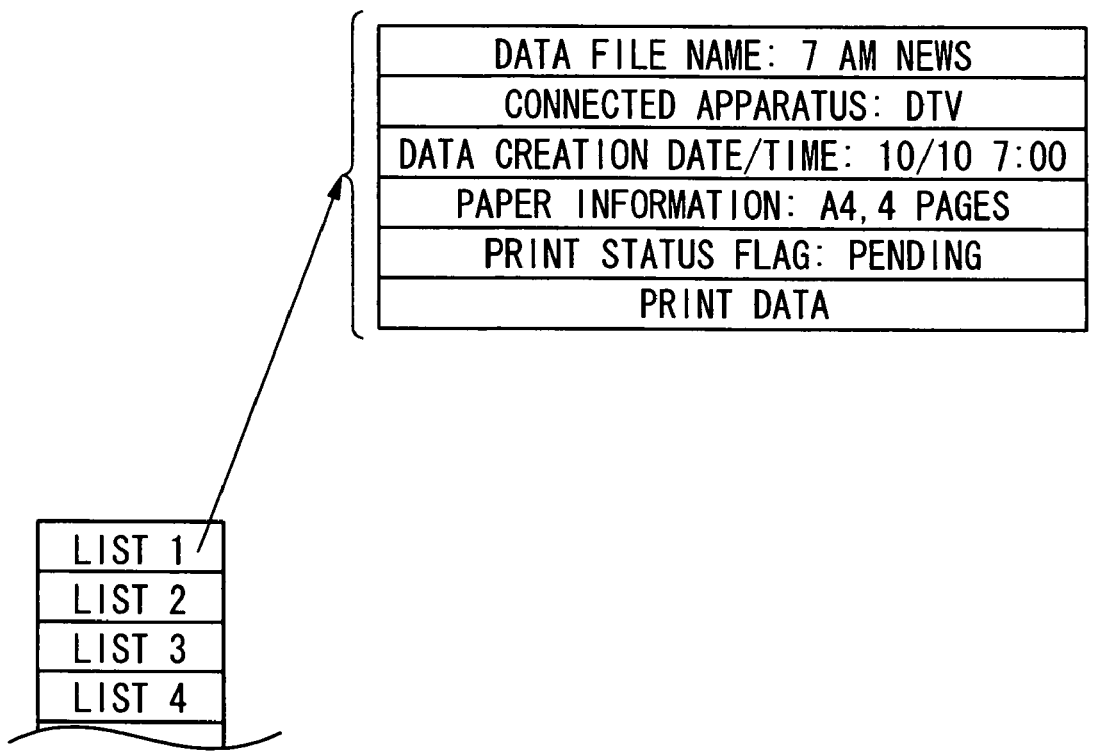
FIG. 6 is an illustrative diagram showing a structure of data stored in a print data storage unit in the network printing apparatus.

FIG. 4 is a diagram showing the interface panel in this state. The print data list is displayed on the display 51 of the interface panel serving as the display unit 37, in the form of the memory list, along with the data file name (program name or file name), connected apparatus, data creation date/time (program broadcast date/time or file creation date/time), paper information, and printed/pending status. The data relating to the print data stored in the print data storage unit 43 has the data structure shown in FIG. 6, including elements such as the data file name (program name or file name), the connected apparatus, the data creation date/time (program broadcast date/time or file creation date/time), the paper information, a print status flag, the print data to be printed, and the like, and appropriate elements are selected and displayed on the display device 51.

Figure 7:
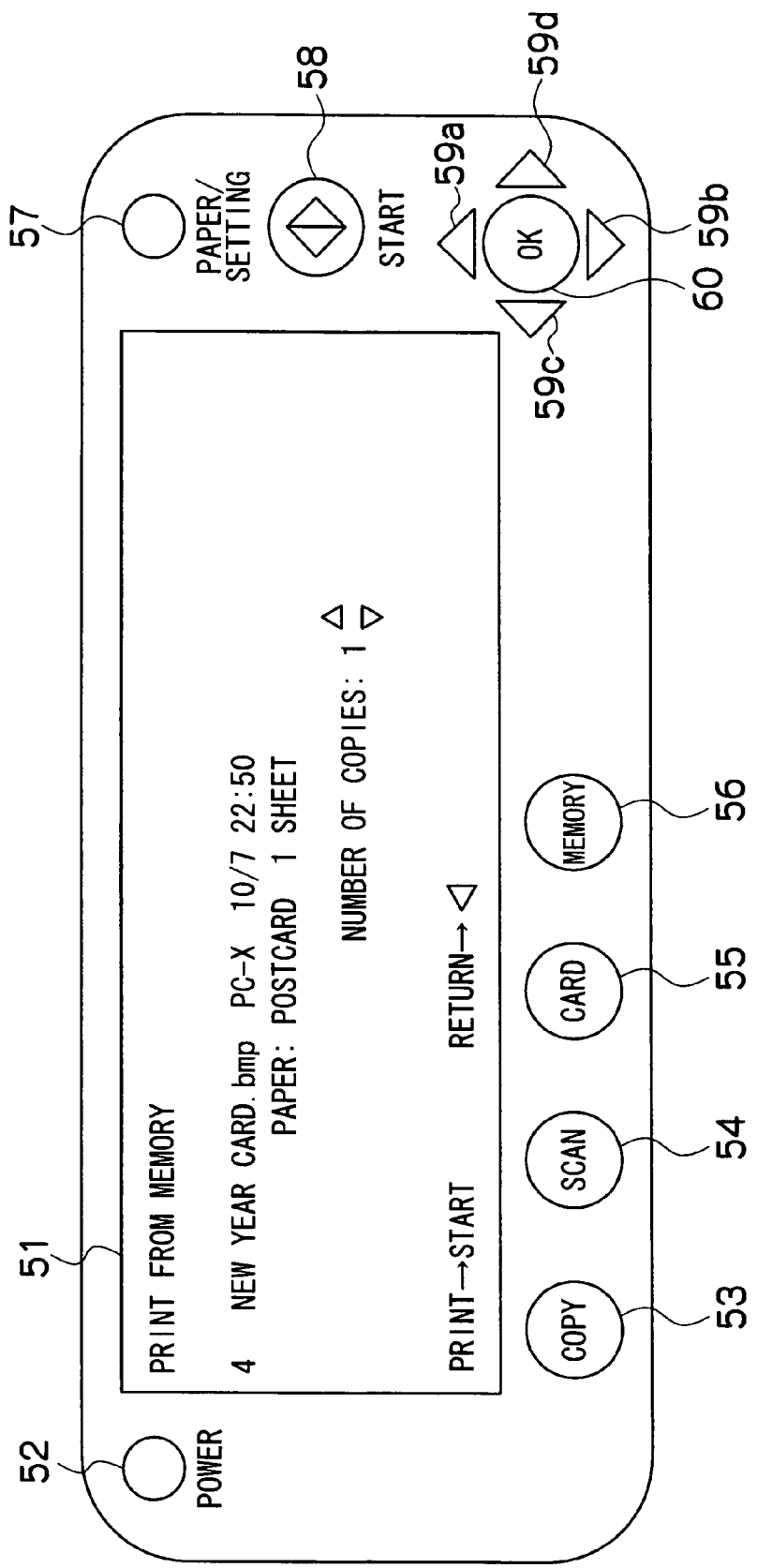
FIG. 7 is a schematic drawing showing a state of the interface panel of the network printing apparatus after selection on the list, according to the first embodiment of the present invention.

Thereupon, at step S110, the user selects the item he or she wishes to print, from the memory list displayed on the display device 51. More specifically, the user selects desired print data by operating the item movement buttons 59a, 59b, 59c and 59d and the OK button 60. FIG. 7 is a diagram showing the interface panel in this state. FIG. 7 shows a screen after the item "4" has been selected from the memory list displayed on the display device 51 in FIG. 4 and the OK button 60 has been pressed. In the state shown in FIG. 7, the information relating to the print data is displayed, and the number of copies to be printed can be selected.

Thereupon, at step S112, the selected print data is printed. More specifically, when the user presses the start button 58, information indicating the pressing of the start button 58 is transmitted to the control unit 35 through the common bus 40. Thereupon, in accordance with a control signal outputted by the control unit 35, the print data stored in the memory unit (not shown) is transmitted to the print unit 34 and is then printed in the print unit 34. The printing method used in the print unit 34 is an inkjet method.

Next, a second embodiment of the present invention is described. In the second embodiment, a registration list is set up for the connected apparatuses, and the operation of the multifunction printer 31 is controlled in accordance with this registration list. Then, it is beforehand required to prepare the registration list relating to the connected apparatuses and to store the registration list into the connected apparatus registration list storage unit 42 in the data storage unit 41.

Figure 8:
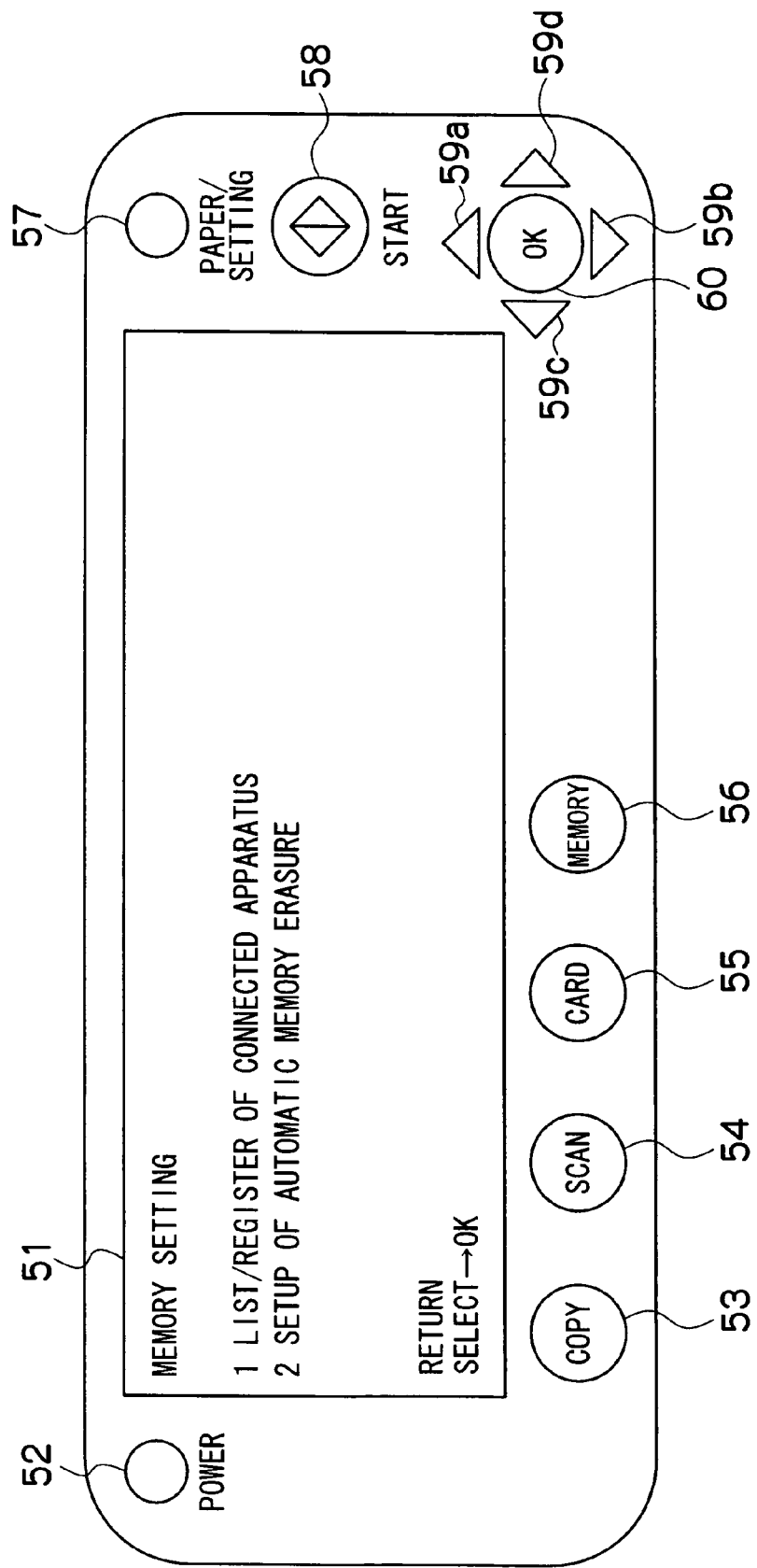
FIG. 8 is a schematic drawing showing a state of the interface panel of the network printing apparatus where a setting screen for setting memory is displayed, according to a second embodiment of the present invention.

The procedure for preparing the registration list is described. Firstly, the user presses the memory button 56 and then presses the paper/settings button 57, on the interface panel shown in FIG. 4. FIG. 8 is a diagram showing the interface panel in this state. As shown in FIG. 8, settings relating to the memory are displayed on the display device 51 of the interface panel. The items shown in FIG. 8 include "list/register of connected apparatus" and "setup of automatic memory erasure".

Thereupon, the user selects one of the aforementioned items by operating the item movement buttons 59a, 59b, 59c and 59d and the OK button 60.

Figure 9:
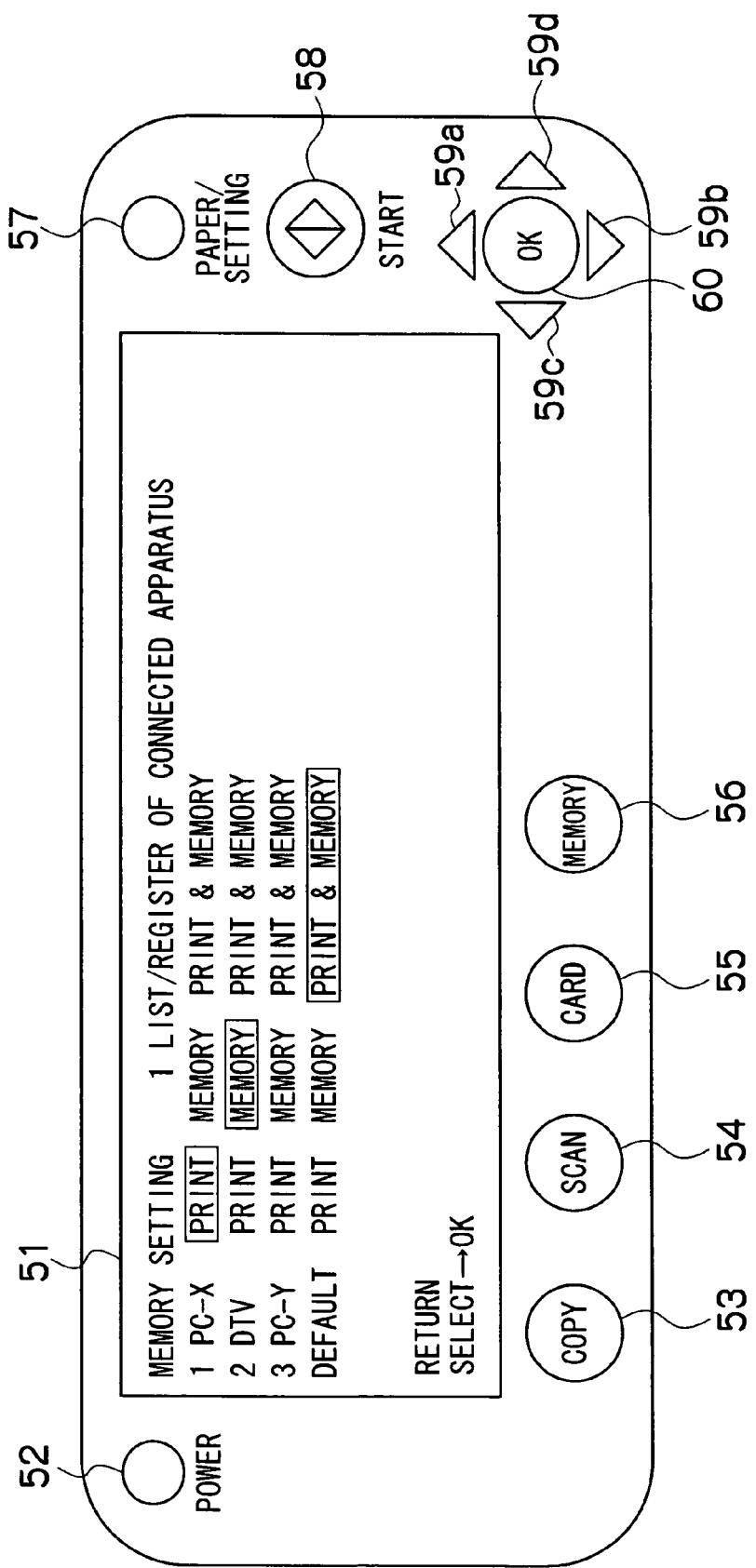
FIG. 9 is a schematic drawing showing a state of the interface panel of the network printing apparatus where a setting screen for setting connected apparatuses is displayed, according to the second embodiment of the present invention.

FIG. 9 is a diagram showing the interface panel in this state where the item "list/register of connected apparatus" has been selected. As shown in FIG. 9, the relationships between the connected apparatuses and the processing are displayed on the display device 51 of the interface panel. Specific contents for the processing include "print", "memory" and "print & memory", and the user selects one of these three items by operating the item movement buttons 59a, 59b, 59c and 59d and the OK button 60. The selected item is enclosed in a frame on the display. In the example shown in FIG. 9, the item "PC-X" displayed on the display device 51 is set to "print" mode, and the item "DTV" is set to "memory" mode. The connected apparatus registration list is prepared through the above-described procedure.

In cases where there is a past history of printing with an apparatus, for instance, this apparatus has been registered automatically in the connected apparatus registration list storage unit 42, and an item corresponding to the apparatus is then displayed on the display device 51 with no settings being made, as the case of "PC-Y" shown on the display device 51 in FIG. 9. Moreover, it is also possible to set up a default processing in order to deal with cases where the connected apparatus settings have not yet been made (for example, the case of "PC-Y" shown on the display device 51 in FIG. 9). The connected apparatus registration list recorded in the connected apparatus registration list storage unit 42 has a file structure shown in FIG. 10. More specifically, the connected apparatus registration list includes the list number, a numerical value representing the content of the registration mode, and the name of the connected apparatus, and the like.

Figure 11:
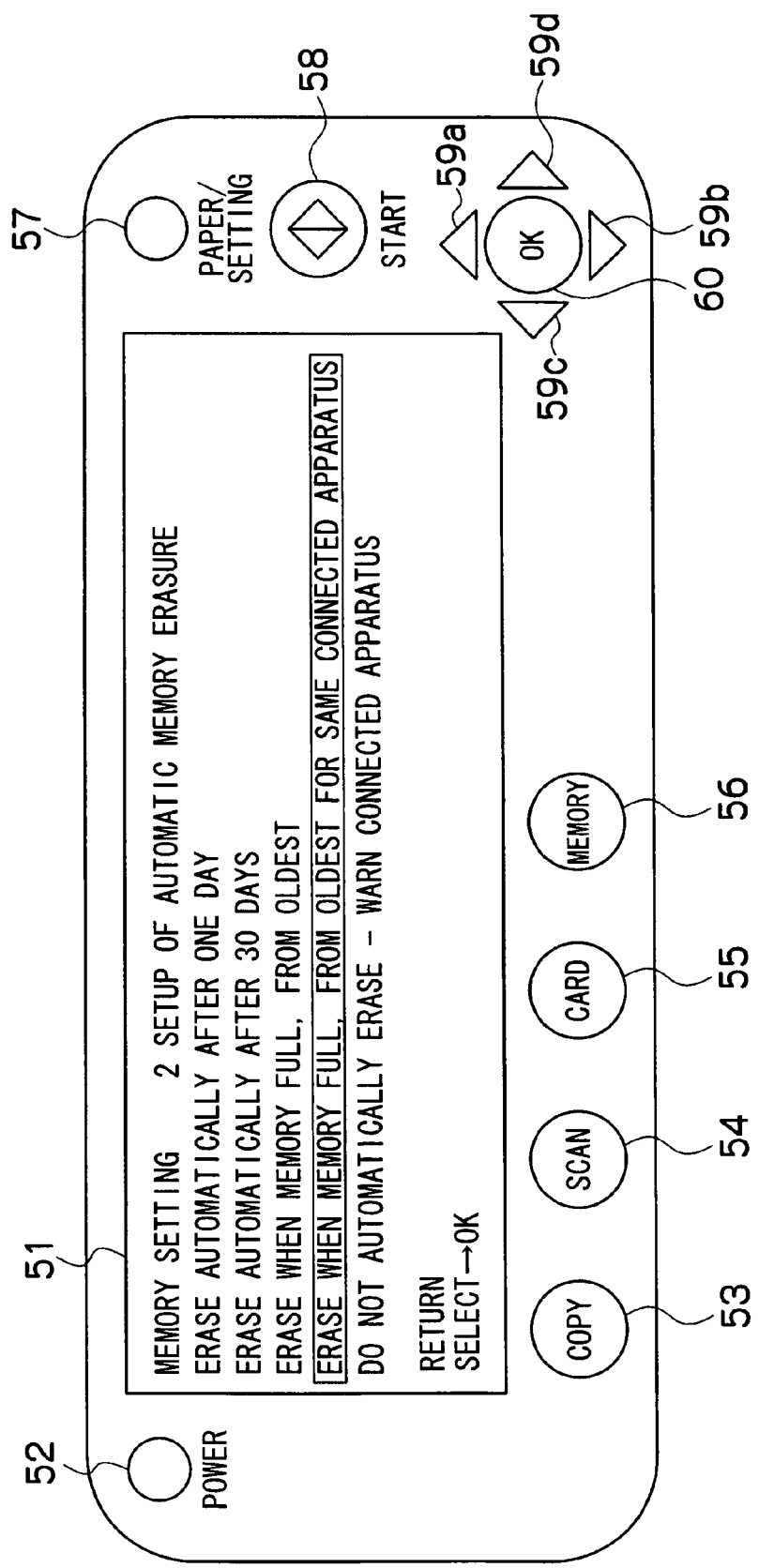
FIG. 11 is a schematic drawing showing a state of the interface panel of the network printing apparatus where a setting screen for setting automatic erasure is displayed, according to the second embodiment of the present invention.

FIG. 11 is a diagram showing the state of the interface panel in a case where the item "setup of automatic memory erasure" has been selected on the display of the display device 51 of the interface panel shown in FIG. 9. As shown in FIG. 11, the user can select a method for erasing the information stored in the print data storage unit 43 of the data storage unit 41 in the multifunction printer 31, through the display device 51 of the interface panel by operating the item movement buttons 59a, 59b, 59c and 59d and the OK button 60. The selected setting for the automatic memory erasure is enclosed in a frame on the display. In the example shown in FIG. 11, the method "erasing automatically the oldest data for the same connected apparatus when the memory is full" is selected.

In the embodiment of the display device 51 shown in FIG. 11, the other settings for the automatic memory erasure include: "erasing automatically after one day"; "erasing automatically after 30 days"; "erasing automatically the oldest data when the memory is full"; and "issuing a warning to the connected apparatus rather than erasing automatically". Any of these settings can be selected.

The sequence of processing in the multifunction printer 31 as the network printing apparatus according to the second embodiment is described with reference to FIG. 12 along with FIGS. 1 to 3.

Figure 12:
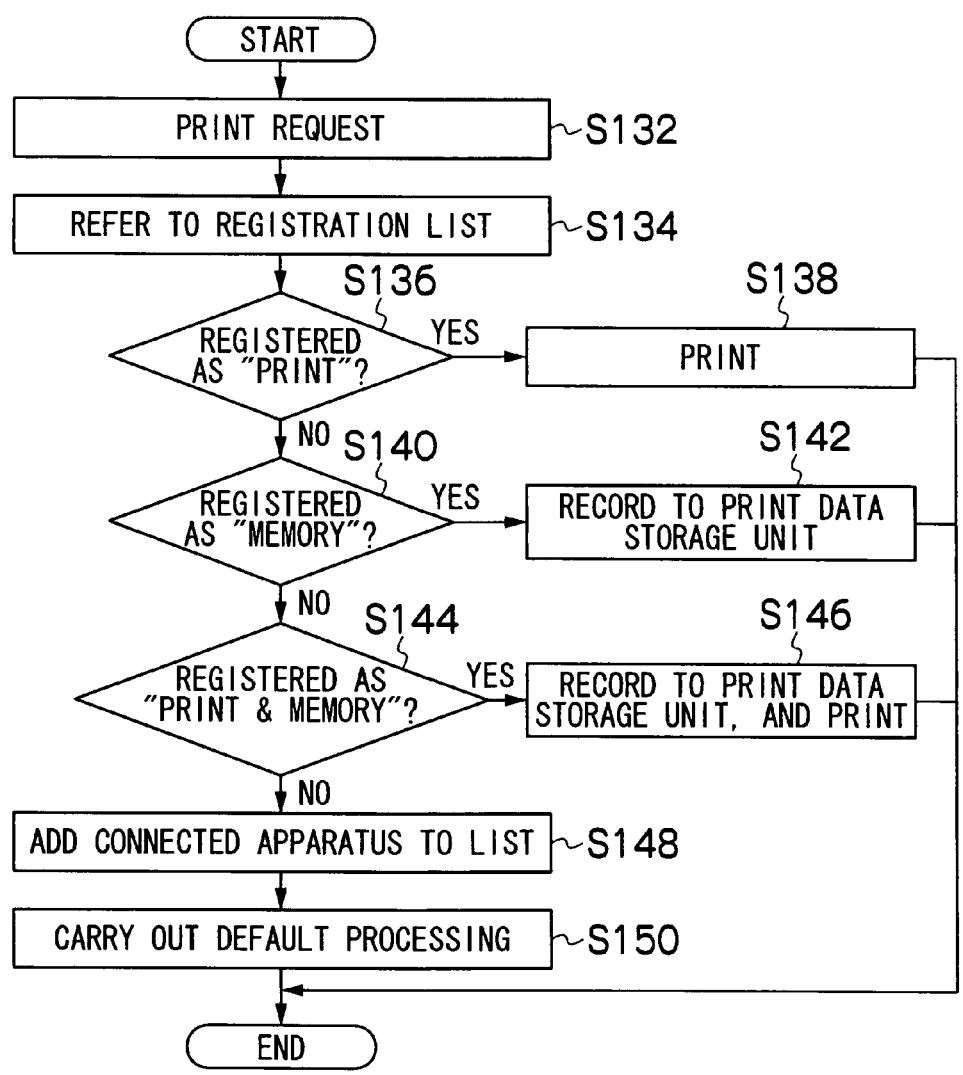
FIG. 12 is a flowchart of processing in the network printing apparatus according to the second embodiment of the present invention.

At step S132 in FIG. 12, when a print request is issued by a connected apparatus, such as the DTV apparatus 21 or the PC 71, which is connected to the home network 11, then a printing processing is started in the multifunction printer 31.

More specifically, the print request is issued to the multifunction printer 31 when the user presses the print button provided for the DTV apparatus 21, or when application software in the PC 71 issues a print instruction, or the like. Upon the print request, print data and the print request information for the multifunction printer 31 is transmitted to the multifunction printer 31 through the home network 11. The transmitted print data is temporarily stored in a memory unit (not shown).

Thereupon, at step S134, the setting information regarding the connected apparatuses that has issued the print request is obtained by referring to the registration list. More specifically, the registration list of the connected apparatuses stored in the connected apparatus registration list storage unit 42 in the data storage unit 41 is read out and then transmitted to the control unit 35 through the common bus 40. Thereupon, in the control unit 35, the setting information (including the information on the processing content, namely, "print", "memory" or "print & memory") concerning the connected apparatus that is connected to the home network 11 and has issued the print request is retrieved from the registration list.

Since the setting of "print", "memory" or "print & memory" is established for each of the connected apparatuses, as described above with reference to FIG. 9, then the setting information acquired through the above-described referring task includes one of these settings.

At step S136, it is judged whether or not the setting in the registration list for the connected apparatus that has issued the print request is registered as "print".

If it is judged at step S136 that the setting in the registration list for the connected apparatus that has issued the print request is registered as "print", then the procedure advances to step S138.

At step S138, the print data having been transmitted to the multifunction printer 31 is printed. More specifically, the print data having been stored in the memory unit (not shown) is transmitted to the print unit 34, and the print data is then printed in the print unit 34, in accordance with a control signal outputted by the control unit 35. The printing method used in the print unit 34 is an inkjet method.

On the other hand, if it is not judged at step S136 that the setting in the registration list for the connected apparatus that has issued the print request is registered as "print", then the procedure advances to step S140.

At step S140, it is judged whether or not the setting in the registration list for the connected apparatus that has issued the print request is registered as "memory".

If it is judged at step S140 that the setting in the registration list for the connected apparatus that has issued the print request is registered as "memory", then the procedure advances to step S142.

At step S142, the print data having been transmitted to the multifunction printer 31 is recorded. More specifically, the print data having been stored in the memory unit (not shown) is transmitted to the data storage unit 41, and the print data is then recorded on the print data storage unit 43, which is the print data storage device in the data storage unit 41, in accordance with a control signal outputted by the control unit 35.

On the other hand, if it is not judged at step S140 that the setting in the registration list for the connected apparatus that has issued the print request is registered as "memory", then the procedure advances to step S144.

At step S144, it is judged whether or not the setting in the registration list for the connected apparatus that has issued the print request is registered as "print & memory".

If it is judged at step S144 that the setting in the registration list for the connected apparatus that has issued the print request is registered as "print & memory", then the procedure advances to step S146.

At step S146, the print data having been transmitted to the multifunction printer 31 is recorded and printed. More specifically, in accordance with a control signal outputted by the control unit 35, the print data having been stored in the memory unit (not shown) is transmitted to both the print unit 34 and the data storage unit 41, and the print data is then not only printed in the print unit 34 but also recorded on the print data storage unit 43 in the data storage unit 41.

On the other hand, if it is not judged at step S144 that the setting in the registration list for the connected apparatus that has issued the print request is registered as "print & memory", then the procedure advances to step S148.

At step S148, if the connected apparatus that has issued the print request has not been registered in the registration list, then the connected apparatus is added to the registration list. More specifically, an updating processing is performed so as to add the connected apparatus that has issued the print request and has not been registered in the registration list, to the registration list stored in the connected apparatus registration list storage unit 42.

Subsequently, the procedure advances to step S150, and the processing registered as the default setting is carried out with respect to the connected apparatus that has issued the print request, for which settings have not yet been specified in the registration list.

In the present embodiment, the default processing is set to "print & memory" as shown in FIG. 10, and therefore the "print & memory" processing is carried out. In other words, the print data having been transmitted to the multifunction printer 31 is recorded and printed. More specifically, in accordance with a control signal outputted by the control unit 35, the print data having been stored in the memory unit (not shown) is transmitted to both the print unit 34 and the data storage unit 41, and the print data is then not only printed in the print unit 34 but also recorded on the print data storage unit 43 in the data storage unit 41.

Next, a third embodiment of the present invention is described. The third embodiment deals with cases where designation of the processing mode is included in the information sent from the connected apparatuses.

The sequence of processing in the multifunction printer 31 as the network printing apparatus according to the third embodiment is described with reference to FIG. 13 along with FIGS. 1 to 3.

Figure 13:
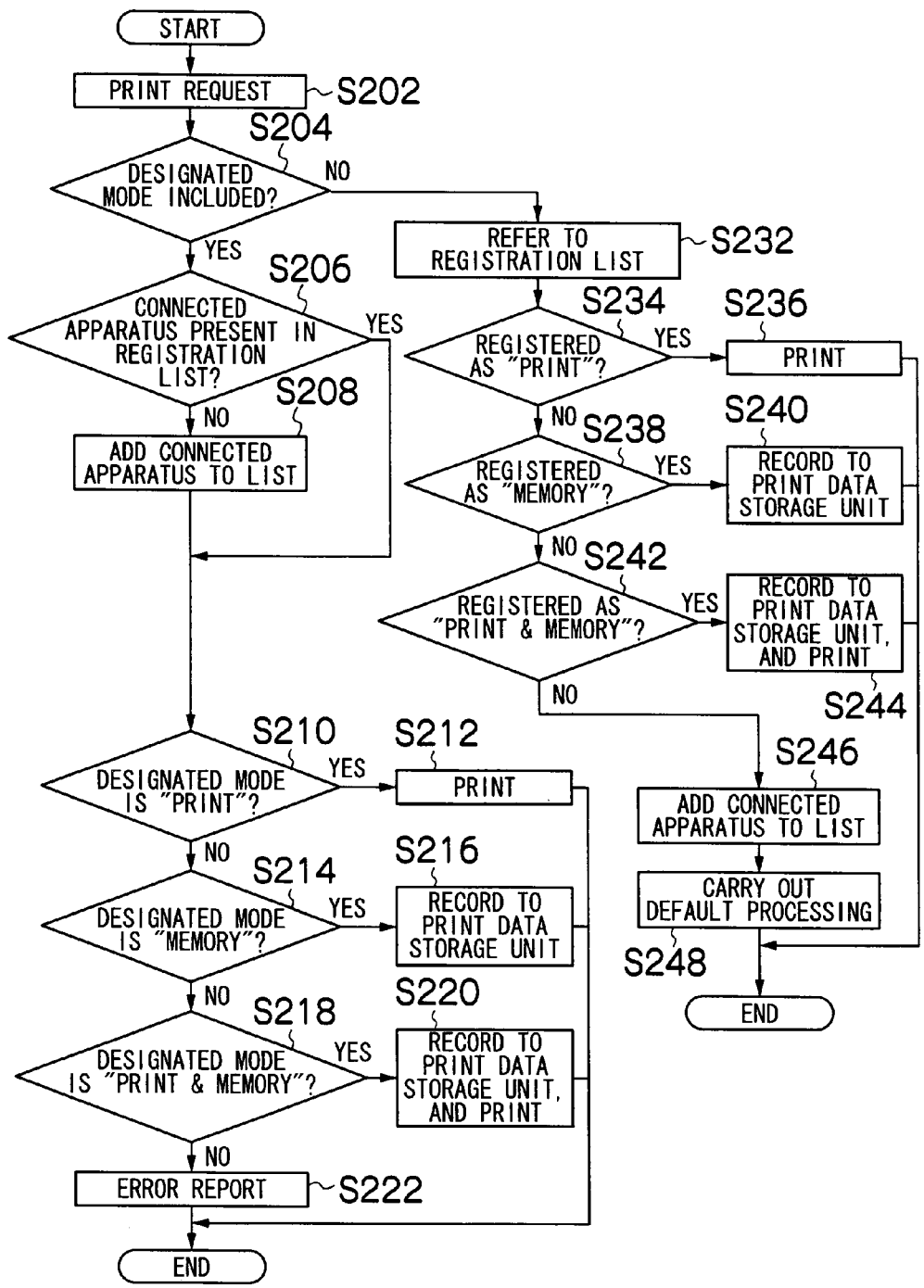
FIG. 13 is a flowchart of processing in the network printing apparatus according to a third embodiment of the present invention.

At step S202 in FIG. 13, when a print request is issued by a connected apparatus, such as the DTV apparatus 21 or the PC 71, which is connected to the home network 11, then a printing processing is started in the multifunction printer 31.

More specifically, the print request is issued to the multifunction printer 31 when the user presses the print button provided for the DTV apparatus 21, or when application software in the PC 71 issues a print instruction, or the like. Upon the print request, print data and the print request information for the multifunction printer 31 is transmitted to the multifunction printer 31 through the home network 11. The transmitted print data is temporarily stored in a memory unit (not shown).

Thereupon, at step S204, it is judged whether or not a designated mode is included in the print request information.

More specifically, the print request information having been stored in the memory unit (not shown) is transmitted to the control unit 35 through the common bus 40. In the control unit 35, it is judged whether or not the designation of the processing mode is included in the print request information. The designated mode is information regarding the processing that is designated by the connected apparatus to be carried out by the multifunction printer 31. Normally, one of the settings, "following the setting of the printer", "print", "memory" and "print & memory", is designated as the processing mode; however, there are cases where the designated mode is not included in the print request information, depending on the connected apparatuses.

If it is judged at step S204 that the designated mode is included in the print request information, then the procedure advances to step S206.

At step S206, it is judged whether or not the connected apparatus that has issued the print request is on the registration list.

More specifically, the registration list of the connected apparatuses stored in the connected apparatus registration list storage unit 42 in the data storage unit 41 is transmitted to the control unit 35 through the common bus 40. The control unit 35 judges whether or not the connected apparatus that is connected to the home network 11 and has issued the print request is present in the registration list.

If it is judged at step S206 that the connected apparatus that has issued the print request is present in the registration list, then the procedure advances to step S210.

On the other hand, if it is not judged at step S206 that the connected apparatus that has issued the print request is present in the registration list, then the procedure advances to step S208.

At step S208, the connected apparatus that has issued the print request and has not been registered in the registration list is added to the registration list. More specifically, the connected apparatus registration list storage unit 42 in the data storage unit 41 carries out an updating processing so as to add the connected apparatus that has issued the print request and has not been registered in the registration list, to the registration list.

Thereupon, at step S210, it is judged whether or not the designated mode is the "print" mode. More specifically, it is judged whether or not the designated mode included in the print request information read out by the control unit 35 is the "print" mode.

If it is judged at step S210 that the designated mode is the "print" mode, then the procedure advances to step S212.

At step S212, the print data having been transmitted to the multifunction printer 31 is printed. More specifically, the print data having been stored in the memory unit (not shown) is transmitted to the print unit 34, and the print data is then printed in the print unit 34, in accordance with a control signal outputted by the control unit 35. The printing method used in the print unit 34 is an inkjet method.

On the other hand, if it is not judged at step S210 that the designated mode is the "print" mode, then the procedure advances to step S214.

At step S214, it is judged whether or not the designated mode is the "memory" mode.

More specifically, it is judged whether or not the designated mode included in the print request information read out by the control unit 35 is the "memory" mode.

If it is judged at step S214 that the designated mode is the "memory" mode, then the procedure advances to step S216.

At step S216, the print data having been transmitted to the multifunction printer 31 is recorded. More specifically, the print data having been stored in the memory unit (not shown) is transmitted to the data storage unit 41, and the print data is then recorded on the print data storage unit 43, which is the print data storage device in the data storage unit 41, in accordance with a control signal outputted by the control unit 35.

On the other hand, if it is not judged at step S214 that the designated mode is the "memory" mode, then the procedure advances to step S218.

At step S218, it is judged whether or not the designated mode is the "print & memory" mode. More specifically, it is judged whether or not the designated mode included in the print request information read out by the control unit 35 is the "print & memory" mode.

If it is judged at step S218 that the designated mode is the "print & memory" mode, then the procedure advances to step S220.

At step S220, the print data having been transmitted to the multifunction printer 31 is recorded and printed. More specifically, in accordance with a control signal outputted by the control unit 35, the print data having been stored in the memory unit (not shown) is transmitted to both the print unit 34 and the data storage unit 41, and the print data is then not only printed in the print unit 34 but also recorded on the print data storage unit 43 in the data storage unit 41.

On the other hand, if it is not judged at step S218 that the designated mode is the "print & memory" mode, then the procedure advances to step S222.

At step S222, an error report is transmitted to the connected apparatus that has issued the print request. More specifically, error report information is transmitted from the control unit 35 to the I/F unit 39 through the common bus 40, and is further transmitted through the home network 11 to the connected apparatus that has issued the print request, then the error report is displayed.

However, the error information is transmitted only in the cases of unexpected problems in the apparatus, or the like, and the error report information is hardly ever transmitted. Hence, no inconvenience is caused to viewers normally watching the DTV apparatus.

If it is not judged at step S204 that the designated mode is included in the print request information, then the procedure moves to step S232.

At step S232, the setting information regarding the connected apparatuses that has issued the print request is obtained by referring to the registration list. More specifically, the registration list of the connected apparatuses stored in the connected apparatus registration list storage unit 42 in the data storage unit 41 is read out and then transmitted to the control unit 35 through the common bus 40. Thereupon, in the control unit 35, the setting information (including the information on the processing content, namely, "print", "memory" or "print & memory") concerning the connected apparatus that is connected to the home network 11 and has issued the print request is retrieved from the registration list.

Since the setting of "print", "memory" or "print & memory" is established for each of the connected apparatuses, as described above with reference to FIG. 9, then the setting information acquired through the above-described referring task includes one of these settings.

At step S234, it is judged whether or not the setting in the registration list for the connected apparatus that has issued the print request is registered as "print".

If it is judged at step S234 that the setting in the registration list for the connected apparatus that has issued the print request is registered as "print", then the procedure advances to step S236.

At step S236, the print data having been transmitted to the multifunction printer 31 is printed. More specifically, the print data having been stored in the memory unit (not shown) is transmitted to the print unit 34, and the print data is then printed in the print unit 34, in accordance with a control signal outputted by the control unit 35. The printing method used in the print unit 34 is an inkjet method.

On the other hand, if it is not judged at step S234 that the setting in the registration list for the connected apparatus that has issued the print request is registered as "print", then the procedure advances to step S238.

At step S238, it is judged whether or not the setting in the registration list for the connected apparatus that has issued the print request is registered as "memory".

If it is judged at step S238 that the setting in the registration list for the connected apparatus that has issued the print request is registered as "memory", then the procedure advances to step S240.

At step S240, the print data having been transmitted to the multifunction printer 31 is recorded. More specifically, the print data having been stored in the memory unit (not shown) is transmitted to the data storage unit 41, and the print data is then recorded on the print data storage unit 43, which is the print data storage device in the data storage unit 41, in accordance with a control signal outputted by the control unit 35.

On the other hand, if it is not judged at step S238 that the setting in the registration list for the connected apparatus that has issued the print request is registered as "memory", then the procedure advances to step S242.

At step S242, it is judged whether or not the setting in the registration list for the connected apparatus that has issued the print request is registered as "print & memory".

If it is judged at step S242 that the setting in the registration list for the connected apparatus that has issued the print request is registered as "print & memory", then the procedure advances to step S244.

At step S244, the print data having been transmitted to the multifunction printer 31 is recorded and printed. More specifically, in accordance with a control signal outputted by the control unit 35, the print data having been stored in the memory unit (not shown) is transmitted to both the print unit 34 and the data storage unit 41, and the print data is then not only printed in the print unit 34 but also recorded on the print data storage unit 43 in the data storage unit 41.

On the other hand, if it is not judged at step S242 that the setting in the registration list for the connected apparatus that has issued the print request is registered as "print & memory", then the procedure advances to step S246.

At step S246, if the connected apparatus that has issued the print request has not been registered in the registration list, then the connected apparatus is added to the registration list. More specifically, an updating processing is performed so as to add the connected apparatus that has issued the print request and has not been registered in the registration list, to the registration list stored in the connected apparatus registration list storage unit 42.

Subsequently, the procedure advances to step S248, and the processing registered as the default setting is carried out with respect to the connected apparatus that has issued the print request, for which settings have not yet been specified in the registration list.

In the present embodiment, the default processing is set to "print & memory" as shown in FIG. 10, and therefore the "print & memory" processing is carried out. In other words, the print data having been transmitted to the multifunction printer 31 is recorded and printed. More specifically, in accordance with a control signal outputted by the control unit 35, the print data having been stored in the memory unit (not shown) is transmitted to both the print unit 34 and the data storage unit 41, and the print data is then not only printed in the print unit 34 but also recorded on the print data storage unit 43 in the data storage unit 41.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A network printing apparatus adapted to connection with an external information apparatus through a network, the network printing apparatus comprising:
    a print data acquisition device which acquires print data outputted by the external information apparatus through the network;
    a print data storage device which stores the print data acquired by the print data acquisition device;
    a list display device which displays a list of the print data acquired by the print data acquisition device; and
    a print data selection device with which selection of the print data to be printed is implemented from the list of the print data displayed on the list display device,
    wherein the external information apparatus includes a digital broadcast receiving apparatus which receives data transmitted through digital broadcasting, and the network printing apparatus prints the print data stored in the print data storage device according to the selection having the print data implemented with the print data selection device.

2. The network printing apparatus as defined in claim 1, wherein when the network printing apparatus is in connection with a plurality of the external information apparatuses through the network, selection of processing for the print data acquired by the print data acquisition device is implemented with respect to each of the external information apparatuses that has outputted the print data to be subjected to the processing, the processing being subjected to the selection including to record the print data on the print data storage device and to print the print data.

3. The network printing apparatus as defined in claim 2, further comprising a processing selection device with which the selection of processing for the print data is implemented.

4. The network printing apparatus as defined in claim 2, wherein the selection of processing for the print data is implemented by each of the external information apparatuses.

5. The network printing apparatus as defined in claim 1, wherein when the network printing apparatus is in connection with a plurality of the external information apparatuses through the network, selection of processing for the print data acquired by the print data acquisition device is implemented with respect to each of the external information apparatuses that has outputted the print data to be subjected to the processing, the processing being subjected to the selection including to record the print data on the print data storage device, to print the print data, and to record the print data on the print data storage device and also print the print data.

6. The network printing apparatus as defined in claim 5, further comprising a processing selection device with which the selection of processing for the print data is implemented.

7. The network printing apparatus as defined in claim 5, wherein the selection of processing for the print data is implemented by each of the external information apparatuses.

8. The network printing apparatus as defined in claim 1, wherein the print data storage device includes at least one of a hard magnetic disk and a non-volatile semiconductor memory.

9. The network printing apparatus as defined in claim 1, wherein the network printing apparatus prints the print data by an inkjet method.

10. A network printing apparatus adapted to connection with an external information apparatus through a network, the network printing apparatus comprising:
   a print data acquisition device which acquires print data outputted by the external information apparatus through the network; and
   a print data storage device which stores the print data acquired by the print data acquisition device, wherein
   the external information apparatus includes a digital broadcast receiving apparatus which receives data transmitted through digital broadcasting, and the network printing apparatus prints the print data stored in the print data storage device, and
   when the network printing apparatus is in connection with a plurality of the external information apparatuses through the network, selection of processing for the print data acquired by the print data acquisition device is implemented with respect to each of the external information apparatuses that has outputted the print data to be subjected to the processing, the processing being subjected to the selection including to record the print data on the print data storage device and to print the print data.

11. The network printing apparatus as defined in claim 10, further comprising a processing selection device with which the selection of processing for the print data is implemented.

12. The network printing apparatus as defined in claim 10, wherein the selection of processing for the print data is implemented by each of the external information apparatuses.

13. The network printing apparatus as defined in claim 10, wherein the print data storage device includes at least one of a hard magnetic disk and a non-volatile semiconductor memory.

14. The network printing apparatus as defined in claim 10, wherein the network printing apparatus prints the print data by an inkjet method.

15. A network printing apparatus adapted to connection with an external information apparatus through a network, the network printing apparatus comprising:
   a print data acquisition device which acquires print data outputted by the external information apparatus through the network; and
   a print data storage device which stores the print data acquired by the print data acquisition device, wherein
   the external information apparatus includes a digital broadcast receiving apparatus which receives data transmitted through digital broadcasting, and the network printing apparatus prints the print data stored in the print data storage device, and
   when the network printing apparatus is in connection with a plurality of the external information apparatuses through the network, selection of processing for the print data acquired by the print data acquisition device is implemented with respect to each of the external information apparatuses that has outputted the print data to be subjected to the processing, the processing being subjected to the selection including to record the print data on the print data storage device, to print the print data, and to record the print data on the print data storage device and also print the print data.

16. The network printing apparatus as defined in claim 15, further comprising a processing selection device with which the selection of processing for the print data is implemented.

17. The network printing apparatus as defined in claim 15, wherein the selection of processing for the print data is implemented by each of the external information apparatuses.

18. The network printing apparatus as defined in claim 15, wherein the print data storage device includes at least one of a hard magnetic disk and a non-volatile semiconductor memory.

19. The network printing apparatus as defined in claim 15, wherein the network printing apparatus prints the print data by an inkjet method.

* * * * *